Patented Mar. 16, 1948

2,437,948

UNITED STATES PATENT OFFICE 2,437,948

PRODUCTION OF BRANCHED CHAIN HYDROCARBONS CATALYZED BY A METAL HALIDE CATALYST SUPPORTED BY A COMPOSITE OF ALUMINA AND TITANIA

Eric William Musther Fawcett, Gwilym Islwyn Jenkins, and John Habeshaw, Sunbury-on-Thames, England, assignors to Anglo-Iranian Oil Company Limited, London, England, a British joint-stock corporation No Drawing. Application May 10, 1943, Serial No. 486,424. In Great Britain March 4, 1942

4 Claims. (Cl. 260—683.5)

This invention relates to the production of branched chain aliphatic hydrocarbons by the catalytic treatment of the corresponding normal hydrocarbons.

It is known that such reactions may be carried out by contacting normal hydrocarbons such as n-butane with catalysts, consisting of an anhydrous halide of Al, Fe, Be or a similar metal, of which aluminium chloride is generally preferred.

It is also known that improved operating results are obtained, particularly increase in the conversion rate, if the $AlCl_3$ or other halide is used in admixture with or, as is preferred, is absorbed on a porous inert catalyst support, such as active carbon or alumina gel.

We have now found that a further marked increase in conversion rate in reactions of this type may be obtained by suitably controlling the composition of the catalyst support.

According to the invention we use as catalyst for the isomerisation of normal hydrocarbons a metallic halide of the type referred to absorbed on or mixed with a porous catalyst support consisting essentially of an oxygenated compound of aluminium or silicon or both, which also contains a proportion of titanium advantageously in amount exceeding 5% and not exceeding 25% of the total support, the titanium content being calculated as parts by weight of titanium dioxide in 100 parts of dry material.

Examples of materials that may be used according to the invention are natural minerals of the required composition, for example certain bauxite of Indian origin which may have the following approximate composition—

10% $TiO_2$, 5% $Fe_2O_3$, 85% $Al_2O_3$ or alternatively the materials may be produced artificially as for example by precipitation of a mixed solution of an aluminium and a titanium salt by means of caustic soda, to yield a solid product consisting of aluminium and titanium hydroxides in gel form, the gel being washed to remove soluble salts, followed by drying and grading into particles of convenient size. The materials may be used in a condition containing absorbed water but generally it is preferred to remove this by heating and/or evacuation; it is undesirable however to heat the materials to such temperature that the structural change from the $\alpha$ form of alumina to the $\gamma$ form occurs, since this involves a considerable loss of catalyst activity. If the absorbed water is not removed by heating, this will generally react with aluminium chloride or other halide when the latter is incorporated with the catalyst support, and although the final catalyst activity is not thereby seriously impaired, some waste of aluminium chloride occurs. The catalyst support of the desired composition may be converted into an active catalyst by the addition of aluminium chloride or other halide in a number of ways. Preferably a gas or vapour containing aluminium chloride or other metal volatile halide may be passed through a bed of the catalyst support usually when in situ in the reaction vessel—the support will then absorb the halide until saturation is reached. The supports referred to will absorb up to about 20% by weight of aluminium chloride.

The absorbed halide is very strongly held and only vapourises very slowly from the support when the hydrocarbon stream undergoing isomerisation is passed over or through the finished catalyst, although the halides in question usually have high vapour pressure under the reaction conditions. The catalyst loss may be made good by the continuous or interrupted addition of aluminium chloride or other halide with the hydrocarbon stream in amount sufficient to maintain the catalyst activity substantially constant.

There are a number of alternative methods of catalyst preparation such as the mixture of the powdered support and the desired solid halide, followed by the production from the mixture of pellets or particles by compression or otherwise; or the reaction vessel may be filled with a mixture of the pellets or particles.

In general it is not desirable to employ a greater amount of halide than can be strongly held on the support by absorption, since any excess of halide over this amount generally results in decreased catalyst activity, and the excess halide is rapidly lost from the reaction vessel when the halide has a high vapour pressure under the reaction conditions employed, as is the case with aluminium chloride.

The isomerisation process using the catalysts prepared according to the invention may be carried out by contacting the normal hydrocarbon or hydrocarbons or materials containing these hydrocarbons with the catalyst referred to in batches or continuously in the presence of the hydrocarbons in either vapour or liquid phase.

The reaction may usually be carried out at moderately elevated temperatures not exceeding 250° C., and generally under superatmospheric pressures.

Since isomerisation reactions of this type generally proceed to an equilibrium, we usually submit the mixture of normal and branched chain hydrocarbons produced by a single contact with the catalyst to a separation process—usually a distillation process—to separate partially or completely the unchanged normal hydrocarbons from the branched chain hydrocarbons; the normal hydrocarbons or a fraction containing them are then submitted to further treatment in the same or other reaction system.

It is known that aluminium halide catalysts show increased activity in the presence of hydrogen halides and/or water. Such catalyst activators may generally be used under the processing conditions described.

The advantages obtained by the use of a catalyst support of the composition according to the invention are illustrated by the following examples, namely:

*Example 1.*—Normal butane (20 cc. per minute) containing hydrogen chloride (3% by gas volume) was passed over pure alumina gel (30 cc.) containing no titanium and impregnated with AlCl₃, packed in a reaction vessel maintained at 110° C. and under atmospheric pressure. The product was found to contain 42.5% of isobutane.

Under conditions similar to Example 1, but using a naturally occurring alumina containing 9% titanium (calculated as parts by weight of titanium dioxide in 100 parts of dry material) instead of pure alumina gel, and 1% by volume of hydrogen chloride instead of 3% by volume, the product was found to contain 44.2% of isobutane. A very considerable economy in hydrogen chloride is thus secured by using the titanium-containing support.

*Example 2.*—Under conditions similar to Example 1, but using a stream of normal butane containing 0.15% by weight of hydrogen chloride under a pressure of 10 atmospheres, and at a rate equivalent to 1.01 liquid volumes of normal butane per volume of alumina gel, the product was found to contain 35.5% of isobutane.

Under the same conditions but using the titanium-containing alumina as used in Example 1 instead of pure alumina gel, the product contained 52.5% of isobutane.

We claim:

1. A catalyst for the isomerisation of normal aliphatic hydrocarbons, consisting of a volatile anhydrous metal halide in intimate association with a porous catalyst support consisting essentially of alpha alumina hydrate and a small proportion of titanium hydroxide prepared by partial dehydration of washed alpha alumina hydrate and titanium hydroxide precipitated in gel form from a mixed solution of an aluminium and a titanium salt the proportion of the titanium being in the range 5% to 25% of the total material of the support, the titanium content being reckoned as parts by weight of titanium dioxide in 100 parts of dry material.

2. A catalyst for the isomerisation of normal aliphatic hydrocarbons, consisting of a volatile anhydrous metal halide in intimate association with a solid porous material consisting essentially of alpha alumina hydrate and a small proportion of titanium hydroxide prepared by the partial dehydration, at a temperature below that at which conversion of alumina from its alpha to its gamma form occurs, of a washed mixture of alpha alumina hydrate and titanium hydroxide precipitated in gel form from a mixed solution of an aluminium and a titanium salt the proportion of the titanium being in the range 5% to 25% of the total material of the support, the titanium content being reckoned as parts by weight of titanium dioxide in 100 parts of dry material.

3. A process for the isomerisation of normal paraffin hydrocarbons and particularly normal butane in which the isomerisation feedstock is contacted at a moderately elevated temperature not exceeding 250° C. in the presence of a hydrogen halide catalytic promoter in small proportion with a substance, as catalyst, consisting of a volatile anhydrous metal halide in intimate association with a porous catalyst support consisting essentially of an aluminium oxide, which support also contains a proportion of titanium dioxide in the range 5% to 25% of the total material of the support, the titanium content being reckoned as parts by weight of titanium dioxide in 100 parts of dry material.

4. A process for the isomerisation of normal paraffin hydrocarbons and particularly normal butane in which the isomerisation feedstock is contacted at a moderately elevated temperature not exceeding 250° C. in the presence of a hydrogen halide catalytic promoter in small proportion and under superatmospheric pressure with a substance, as catalyst, consisting of a volatile anhydrous metal halide in intimate association with a porous catalyst support consisting essentially of an aluminium oxide, which support also contains a proportion of titanium dioxide in the range 5% to 25% of the total material of the support, the titanium content being reckoned as parts by weight of titanium dioxide in 100 parts of dry material.

ERIC WILLIAM MUSTHER FAWCETT.
GWILYM ISLWYN JENKINS.
JOHN HABESHAW.

REFERENCES CITED

The following references are of record in the file of this patent:

UNITED STATES PATENTS

| Number | Name | Date |
| --- | --- | --- |
| 1,764,024 | John et al. | June 17, 1930 |
| 2,208,362 | Engel | July 16, 1940 |
| 2,265,870 | Schuite | Dec. 9, 1941 |
| 2,274,624 | McMillan et al. | Feb. 24, 1942 |
| 2,277,022 | McMillan et al. | Mar. 17, 1942 |
| 2,277,512 | De Simo et al. | Mar. 24, 1942 |
| 2,280,650 | Kassel | Apr. 21, 1942 |
| 2,309,263 | Thomas | Jan. 26, 1943 |
| 2,311,232 | Ipatieff et al. | Feb. 16, 1943 |
| 2,342,124 | Danforth | Feb. 22, 1944 |
| 2,351,577 | Thomas | June 13, 1944 |

FOREIGN PATENTS

| Number | Country | Date |
| --- | --- | --- |
| 445,727 | Great Britain | Apr. 17, 1936 |
| 576,086 | Great Britain | Mar. 19, 1946 |

OTHER REFERENCES

Edwards et al.: Aluminum and Its Production, vol. I, McGraw-Hill, N. Y., 1930; page 65 and pages 164–168.